Oct. 21, 1958 R. A. MUELLER 2,857,231

EASY ACCESS CHASSIS MOUNT

Filed Jan. 10, 1956

INVENTOR.
RICHARD A. MUELLER
BY George Sipkin
George E. Pearson
ATTORNEYS 2,857,231

EASY ACCESS CHASSIS MOUNT

Richard A. Mueller, San Diego, Calif.

Application January 10, 1956, Serial No. 558,388
6 Claims. (Cl. 312—304)
(Granted under Title 35, U. S. Code (1952), sec. 266)

Figure 1:
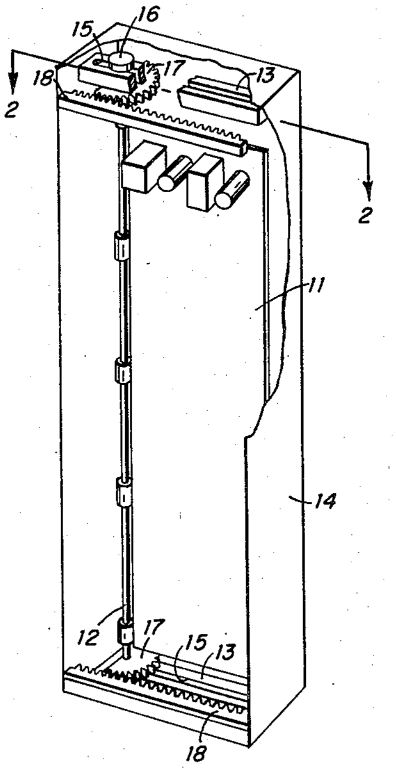

The invention described herein may be manufactured and used by or for the Government of the United States of America for governmental purposes without the payment of any royalties thereon or therefor.

This invention relates to an easy access electronic package and more particularly to means for pivotally supporting a compact chassis in vertical position to provide easy access to either side of the chassis for servicing.

Most methods of packaging of electrical and electronic components provide for either compactness or accessibility but not both. Those previous attempts in devising suitable packaging which was both compact and accessible have been only partially successful. Most noteworthy of these have utilized drawers which can be tilted after being withdrawn. Components and wiring on either the top or bottom surfaces of one drawer are accessible individually but not both surfaces simultaneously. In cabinets having more than one drawer, simultaneous access to all drawers was impossible.

The chassis mount for electronic equipment comprising the present invention consists of novel mounting brackets in the top and bottom of the cabinet to which is pivoted a chassis mounted shaft. Suitable electronic equipment is mounted on both surfaces of the chassis as desired. Upon opening the door or removal of the front panel, one surface of the chassis is exposed. As the chassis is pivoted, the pivot shaft moves from one side of the cabinet toward the center, so that when the shaft reaches the center the chassis is 90° to the front surface of the cabinet with both surfaces of the chassis exposed and readily accessible to the serviceman. As the chassis is further rotated to place the opposite side of the chassis in parallel with the front surface of the cabinet, the shaft is moved to the other side of the cabinet. In this manner the eletronic components may be compactly mounted on a chassis and still be readily accessible for servicing. Moreover, adjacent cabinets having similar mountings are accessible simultaneously since one exposed chassis does not interfere with the pivoting of another.

It is therefore an object of the present invention to provide for an improved electronic package in which both sides of a chassis are readily accessible.

A further object is the provision of mounting brackets and supporting structure for pivotally mounting a chassis in vertical position.

Another object is the provision of a pivotally mounted chassis both surfaces of which may be exposed for servicing simultaneously.

Still another object is the provision of a pivotally mounted chassis in which the pivotal axis moves from one extreme position to the opposite extreme position as the chassis is pivoted to expose the heretofore unexposed chassis surface.

Figure 2:
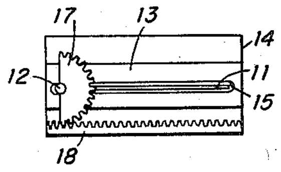
Figure 3:
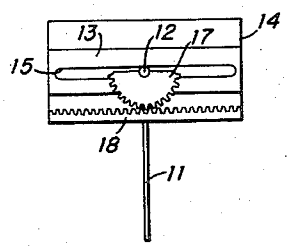
Figure 4:
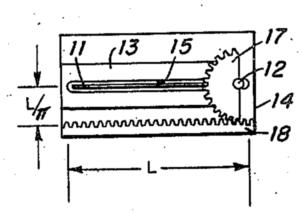

Other objects and many of the attendant advantages of this invention will be readily appreciated as the same becomes better understood by reference to the following detailed description when considered in connection with the accompanying drawings wherein:

Fig. 1 shows a front view of an electronic package with the front removed to expose the inner parts to view;

Fig. 2 is a plan view of the top chassis mounting structure taken along the lines 2—2 in Fig. 1; and Fig. 3 and Fig. 4 are similar plan views in which the chassis is pivoted 90° and 180° respectively to expose the back surface of the chassis for servicing.

Referring now to the drawings wherein like numerals designate like parts throughout the several views, chassis 11, to which all components and wiring is mounted, is fastened to shaft 12. Guides 13 mounted horizontally across the top and bottom of the cabinet 14 have slots 15 therein in which is confined shaft 12. These slots 15 are equal in length to the length of the top edge of the chassis. Thrust bearing 16, attached to shaft 12, rides on the upper guide 13 to carry the load of the chassis 11. Gears 17 are rigidly mounted to shaft 12 and mesh with racks 18 which are fastened to the cabinet 14 parallel to the slots 15. It should be noted that gears 17 have a semi-circumference equal in length to the length of slots 15, so that in rotating the gears 180° shaft 12 moves from one end of the slot to the other. Since $$L=\frac{c}{2}$$

where $L$=length of slot and $c$=gear circumference, and $2\pi R=c$ where $R$=radius, then $$R=\frac{L}{\pi}$$

Therefore, slots 15 are spaced rearwardly a distance of $$\frac{L}{\pi}$$

from racks 18 which are positioned across the front of the cabinet. This permits the chassis to extend forwardly as shown in Fig. 3 by the maximum amount for optimum accessibility. Since shaft 12 is mounted to the chassis 11 along one vertical surface thereof the chassis would sag except for the gear 17, rack 18 and guide 13 mounted in the bottom of the cabinet in alignment with like parts mounted in the top.

As shown in Figs. 2–4, as chassis 11 is rotated in a clockwise direction through an arc of 180° gears 17 move shaft 12 from left to right so that at all times the chassis is within the area of the cabinet projected forwardly. In this manner, servicing of adjacent cabinets may be effected without interference. Fig. 3 shows the intermediate condition where the chassis 11 is projecting perpendicularly out of the cabinet to provide easy accessibility to the entirety of both sides of the chassis. Means (not shown) may be provided for locking the chassis in the 0°, 90°, and 180° positions as desired.

While the chassis packaging comprising this invention has been described with the chassis pivoting on a vertical axis moving horizontally across the cabinet, this invention may be practiced with the chassis rotating about a horizontal axis moving vertically across the cabinet. Other ways of effecting the rotary and translational movement of the chassis for easy and ready accessibility of the front and back, as well as other modifications, will undoubtedly occur to those skilled in the art. It should be understood therefore that this invention may be practiced within the scope of the appended claims in a manner other than as specifically described.

What is claimed is:

1. In an electronics package, a housing, a guide within said housing and having an elongated slot therein, a shaft mounted for movement in said slot. a chassis mounted at one edge thereof to said shaft, a gear rigidly attached to said shaft, a gear rack attached to said housing and in engagement with said gear throughout movement of said gear, said gear and said rack being operable to move said shaft along said slot upon rotation of said shaft.

2. In an electronics package, a chassis for mounting electronic components on both sides thereof, a housing for said chassis, said housing including definable front and side surfaces, a pair of guides extending laterally across said housing, said guides each having an elongated slot extending parallel with said front surface, a shaft attached to said chassis along one edge thereof, said shaft extending through both said slots, means for continuously rotating said shaft through an angle of 180° simultaneously with movement of said shaft from one end of said slots to the other.

3. In an electronics package as in claim 2 wherein said means includes gears mounted at each end of said shaft and having a radius equal to the length of said slots divided by $\pi$, and a pair of gear racks mounted respectively at the top and bottom of said housing for engagement with said gears throughout the rotation thereof.

4. In an electronics package as in claim 3 wherein said slots are spaced from said front surface substantially a distance equal to the radius of said gears to provide optimum accessibility to both sides of said chassis when said shaft is centered in said slots and said chassis extends outwardly 90° from said front surface of said housing.

5. In an electronics package, a housing having a front and side surface, a shaft, a mounting for rotatively mounting said shaft in said housing parallel to said front surface, said mounting including means for continuously moving said shaft in the plane of said shaft and parallel with said front surface simultaneously with rotation of said shaft, said means including a slot engageable with said shaft and extending laterally across said housing, and gear means rigidly attached to said shaft and having a gear radius equal to the length of said slot divided by $\pi$, means on said housing frictionally engageable with said gear means, whereby rotation of said shaft one-half revolution moves said shaft from one side of said housing to the opposite side.

6. In an electronics package as in claim 5, movement of said shaft from one side of housing to the opposite side being in the ratio of 1:2 with respect to said rotation of said shaft.

References Cited in the file of this patent

UNITED STATES PATENTS

| | | |
|---|---|---|
| 393,938 | Thompson | Dec. 4, 1888 |
| 2,558,569 | Koch | June 26, 1951 |